April 20, 1926.
E. A. WATTS
PISTON ROD CONSTRUCTION
Filed Oct. 13, 1924
1,581,255
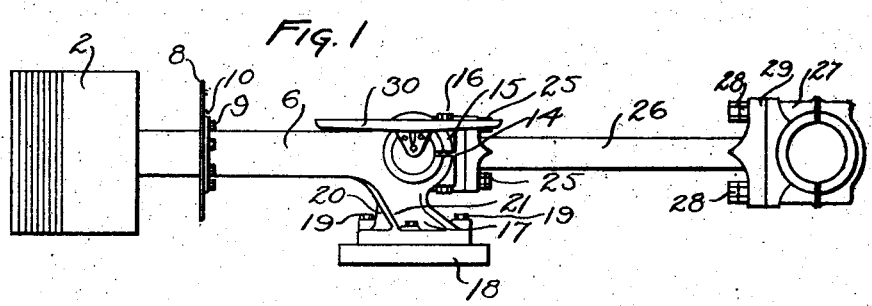
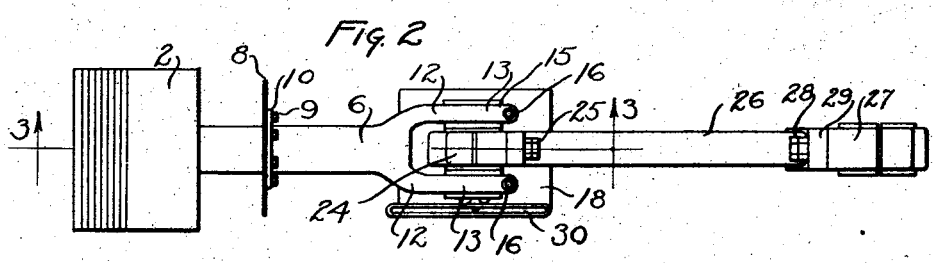
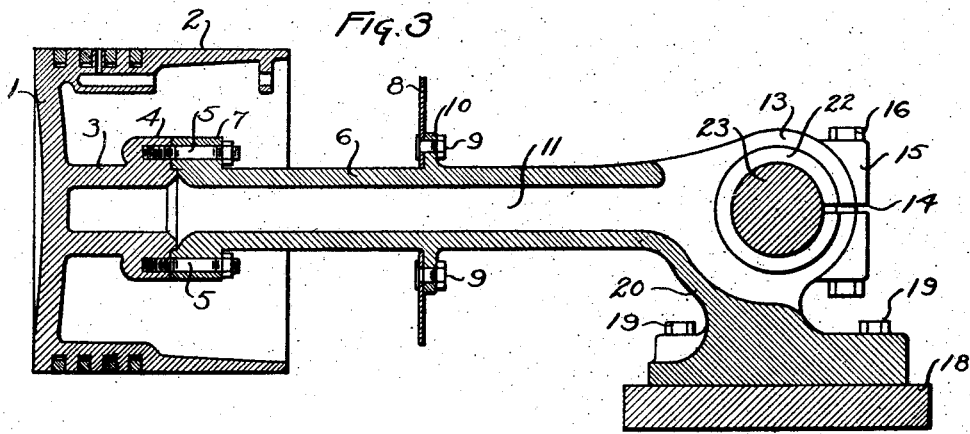
INVENTOR.
Elmer A. Watts
BY Toulmin & Toulmin
ATTORNEYS.

Patented Apr. 20, 1926.

1,581,255

UNITED STATES PATENT OFFICE.

ELMER A. WATTS, OF SPRINGFIELD, OHIO, ASSIGNOR TO THE MILLER IMPROVED GAS ENGINE COMPANY, OF SPRINGFIELD, OHIO, A CORPORATION OF OHIO.

PISTON-ROD CONSTRUCTION.

Application filed October 13, 1924. Serial No. 743,431.

*To all whom it may concern:*

Be it known that I, ELMER A. WATTS, a citizen of the United States, residing at Springfield, in the county of Clark and State of Ohio, have invented certain new and useful Improvements in Piston-Rod Constructions, of which the following is a specification, reference being had therein to the accompanying drawing.

My invention relates to internal combustion engines and in particular to the piston and piston rod therefor.

It is the object of my invention to provide a detachable piston and piston rod so that the piston rod, slide and mechanism may be withdrawn from the cylinder without disturbing the piston.

It is a further object of my invention to provide a one piece piston rod support in connection with the slide and a piston rod.

It is an additional object of my invention to provide a tubular piston rod having a forked end to provide a broad bearing surface for the engagement of the rod with the connecting link to the fly wheel crank shaft.

It is an additional object of my invention to provide a splash plate on the piston rod.

It is a further object of my invention to provide a mechanical construction by having the rod and support on the slide a separate member from the piston which facilitates manufacture and permits of the selection of different materials for the two structures.

Referring to the accompanying drawings:

Figure 1 is a side elevation of the assembled piston rod, piston and connecting link;

Figure 2 is a plan view thereof; and

Figure 3 is a section on the line 3—3 of Figure 2 looking in the direction of the arrows.

Referring to the drawings in detail, 1 is a piston having an apron 2. The piston contains an interiorly arranged depending cylindrical piston rod support 3 having an enlarged head 4 for the reception of a plurality of spaced bolts 5 which connects the piston rod 6 thereto. The piston rod is formed with an enlarged head 7 through which these bolts pass. On the piston rod is mounted a splash plate 8 by a plurality of bolts 9 on the laterally extending ring 10 which is integral with the piston rod.

The piston rod has a tubular aperture in the center designated 11 which is open at either end, thus securing light weight with rigidity of the structure. The piston rod terminates in a pair of spaced outwardly flaring parallel arms 12 which terminate in bearing-eyes 13. These members 13 are arranged in the form of split collars being separated at 14. They are provided with enlarged tubular shoulders 15 for the reception of bolts 16 to hold the halves of the collars together. The base of the arms are extended into pedestals 17 which are parallel to one another and are attached to a common slide block 18 by the bolts 19. These pedestals are formed with the ribs 20, 21 between the points of attachment to give great rigidity to the structure with the minimum of weight.

In the split collars or eyes 13 are split bearing rings 22 embracing a transversely located shaft upon which is mounted the bearing collar 24 which is bolted by the bolts 25 to the connecting link 26. This link in turn is connected in the conventional manner to the crank arm of the crank shaft and fly wheel by the split bearing collar 27 which is attached to the connecting link 26 by the bolts 28 passing through the head 29 of the connecting link 26.

The structure may be provided with an oil catch basin of conventional design designated 30.

It will be realized that in internal combustion engines where it is found desirable to move the piston rod out of the way without disturbing the piston that this construction is of great advantage. It also largely facilitates the economical restoration or repair of the piston head or piston proper. The piston rod is a structure of relatively small wear, while the piston is subjected to constant wear.

It will be understood that the sliding block 18 may reciprocate in any desired form of conventional guide which does not form a part of the present invention.

It will be understood that I desire to comprehend within my invention such modifications as may be necessary to adapt it to varying conditions of use.

Having thus fully described my invention, what I claim as new and desire to secure by Letters Patent, is:—

1. In an internal combustion engine, a detachable piston and piston rod the point of connection being within the piston skirt, said piston rod having a bifurcated outer end formed into parallel arms for supporting a shaft to which is connected a connecting link, outside of the skirt to prevent movement of the link within and touching the skirt to provide free access for the adjustment and disengagement of the link with the rod.

2. In an internal combustion engine, a detachable piston and piston rod, the point of connection being within the piston skirt, said piston rod having a bifurcated outer end formed into parallel arms for supporting a shaft to which is connected a connecting link, a connecting link, said arms being extended downwardly to form pedestals for attachment on a slide block, and a slide block.

3. In an internal combustion engine, a piston and piston rod detachably attached thereto, the outer ends of said rod terminating in spaced arms having split eyes for the reception of a transverse shaft, and means to draw said eyes together, the point of connection between the split eyes and the transverse shaft being outside of the piston.

4. In an internal combustion engine, a piston and piston rod detachably attached thereto, the outer ends of said rod terminating in spaced arms having split eyes for the reception of a transverse shaft, means to draw said eyes together, depending pedestals from said eyes adapted to be mounted upon a slide block, a slide block, and bolts to attach said pedestals to said block.

5. In an internal combustion engine, a piston and piston rod detachably attached thereto, the outer ends of said rod terminating in spaced arms having split eyes for the reception of a transverse shaft, means to draw said eyes together, depending pedestals from said eyes adapted to be mounted upon a slide block, a slide block, bolts to attach said pedestals to said block, and outwardly and rearwardly extending ribs formed in said pedestals for the strengthening thereof.

6. In an internal combustion engine, a piston having a piston rod formed integral therewith on the interior thereof a portion of the desired length of the piston rod, a second piston rod detachably mounted on the first rod, said point of connection between the integral piston rod and the detachable piston rod being within the skirt of the piston, and a plurality of bolts for attaching the respective parts of the piston rods to one another, said piston rods being tubular.

7. In an internal combustion engine, a piston having a piston rod formed integral therewith on the interior thereof a portion of the desired length of the piston rod, a second piston rod detachably mounted on the first rod, said point of connection between the integral piston rod and the detachable piston rod being within the skirt of the piston, a plurality of bolts for attaching the respective parts of the piston rods to one another, said piston rods being tubular, the last mentioned rod having bifurcated spaced parallel arms formed into split eyes for clamping a transverse shaft therebetween, a connecting link mounted on said shaft betwween said arms and eyes, a pedestal to support each of said arms on a common slide block, and a slide block.

8. In an internal combustion engine, a piston, a piston rod, and a splash plate mounted on said piston rod, margins of the splash plate being arranged at a point remote from the walls of the cylinder and of the piston.

9. In an internal combustion engine, a piston, a piston rod, and a splash plate mounted on said piston rod, margins of the splash plate being arranged at a point remote from the walls of the cylinder and of the piston, said piston and piston rod being detachable one from the other.

In testimony whereof, I affix my signature.

ELMER A. WATTS.